US011213017B2

(12) United States Patent
Heidkamp et al.

(10) Patent No.: US 11,213,017 B2
(45) Date of Patent: Jan. 4, 2022

(54) AVIARY ARRANGEMENT FOR POULTRY ANIMALS AND METHOD OF POULTRY HUSBANDRY

(71) Applicant: BIG DUTCHMAN INTERNATIONAL GMBH, Vechta (DE)

(72) Inventors: Bernd Heidkamp, Vechta (DE); Judith Langfermann, Vechta (DE)

(73) Assignee: BIG DUTCHMAN INTERNATIONAL GMBH, Vechta (DE)

( * ) Notice: Subject to any disclaimer, the term of this patent is extended or adjusted under 35 U.S.C. 154(b) by 348 days.

(21) Appl. No.: 16/486,076

(22) PCT Filed: May 31, 2019

(86) PCT No.: PCT/EP2019/064209
§ 371 (c)(1),
(2) Date: Aug. 14, 2019

(87) PCT Pub. No.: WO2019/229246
PCT Pub. Date: Dec. 5, 2019

(65) Prior Publication Data
US 2021/0329890 A1    Oct. 28, 2021

(30) Foreign Application Priority Data

Jun. 1, 2018    (LU) ........................ 100811

(51) Int. Cl.
*A01K 31/22*    (2006.01)
*A01K 31/17*    (2006.01)
(Continued)

(52) U.S. Cl.
CPC ............ *A01K 31/22* (2013.01); *A01K 1/0047* (2013.01); *A01K 31/04* (2013.01); *A01K 31/17* (2013.01)

(58) Field of Classification Search
CPC ...... A01K 31/22; A01K 31/002; A01K 31/04; A01K 31/06; A01K 31/17
See application file for complete search history.

(56) References Cited

U.S. PATENT DOCUMENTS

2009/0126646 A1    5/2009    Johnston
2015/0122191 A1    5/2015    Rust et al.

FOREIGN PATENT DOCUMENTS

CN    107466900    12/2017
DE    20 2018 101 666    4/2018
(Continued)

*Primary Examiner* — Joshua J Michener
*Assistant Examiner* — Henry Hooper Mudd
(74) *Attorney, Agent, or Firm* — Price Heneveld LLP

(57) ABSTRACT

An aviary arrangement for poultry includes a first and a second aviary row, and a bridge which connects the first and the second aviary rows, wherein each of the aviary rows has a service tier, a nest tier and a resting tier, each having an inclined animal roosting floor, and a manure conveying device arranged therebelow, wherein the resting tier is arranged above the nest tier and the service tier is arranged below the nest tier, and the nest tier has a nest and an egg conveying device, and wherein the bridge is arranged above the manure conveying device of the service tier and has a bridge floor for receiving litter. A manure conveying device is arranged below an inclined animal roosting floor, wherein the animal roosting floor comprises an inclined integrated air duct arranged below the animal roosting floor and above the manure conveying device.

17 Claims, 13 Drawing Sheets

(51) Int. Cl.
*A01K 1/00* (2006.01)
*A01K 31/04* (2006.01)

(56) References Cited

FOREIGN PATENT DOCUMENTS

| | | |
|---|---|---|
| EP | 0965266 | 12/1999 |
| EP | 2878195 | 6/2015 |
| WO | 2005099448 | 10/2005 |
| WO | 2017139590 | 8/2017 |

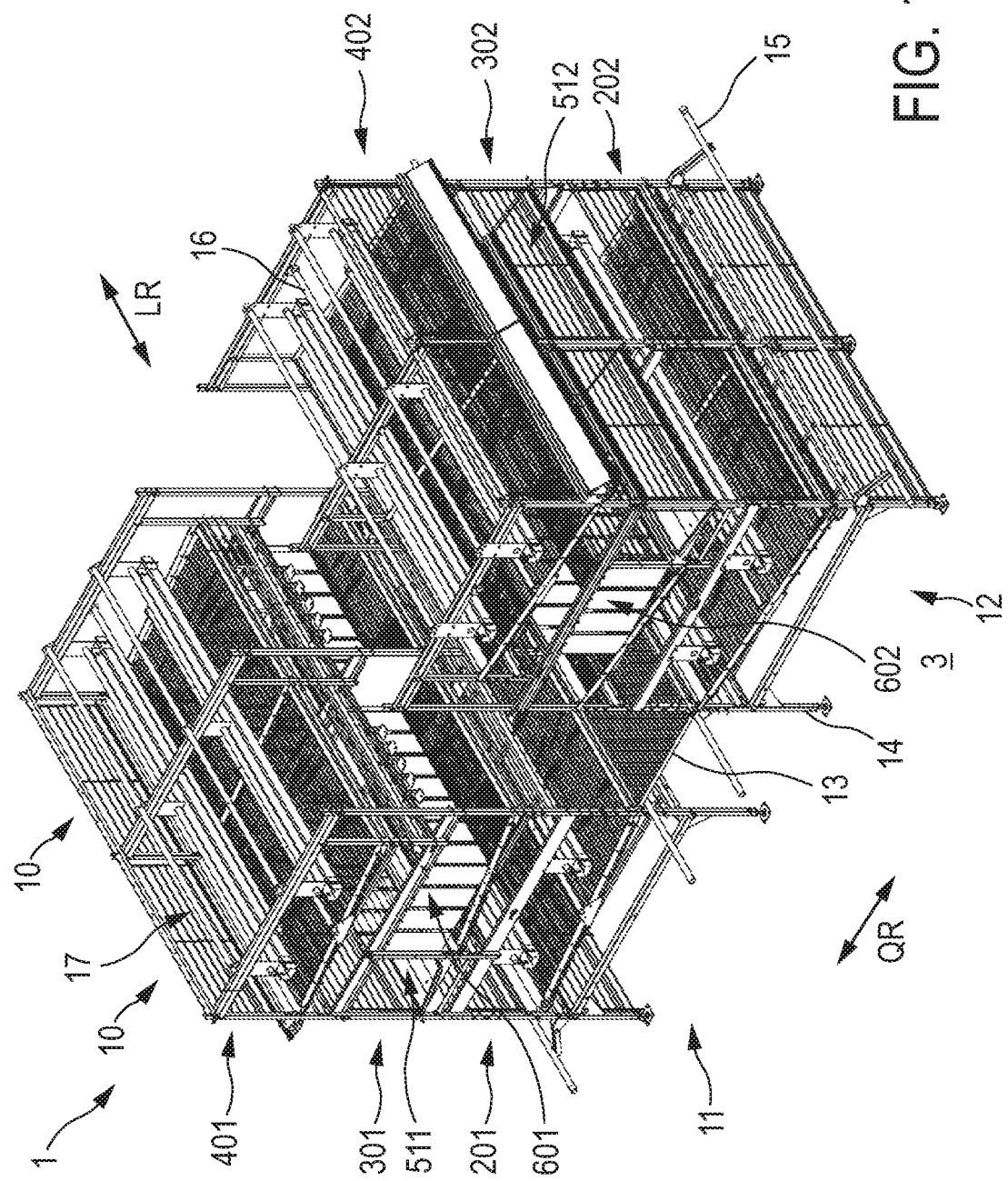

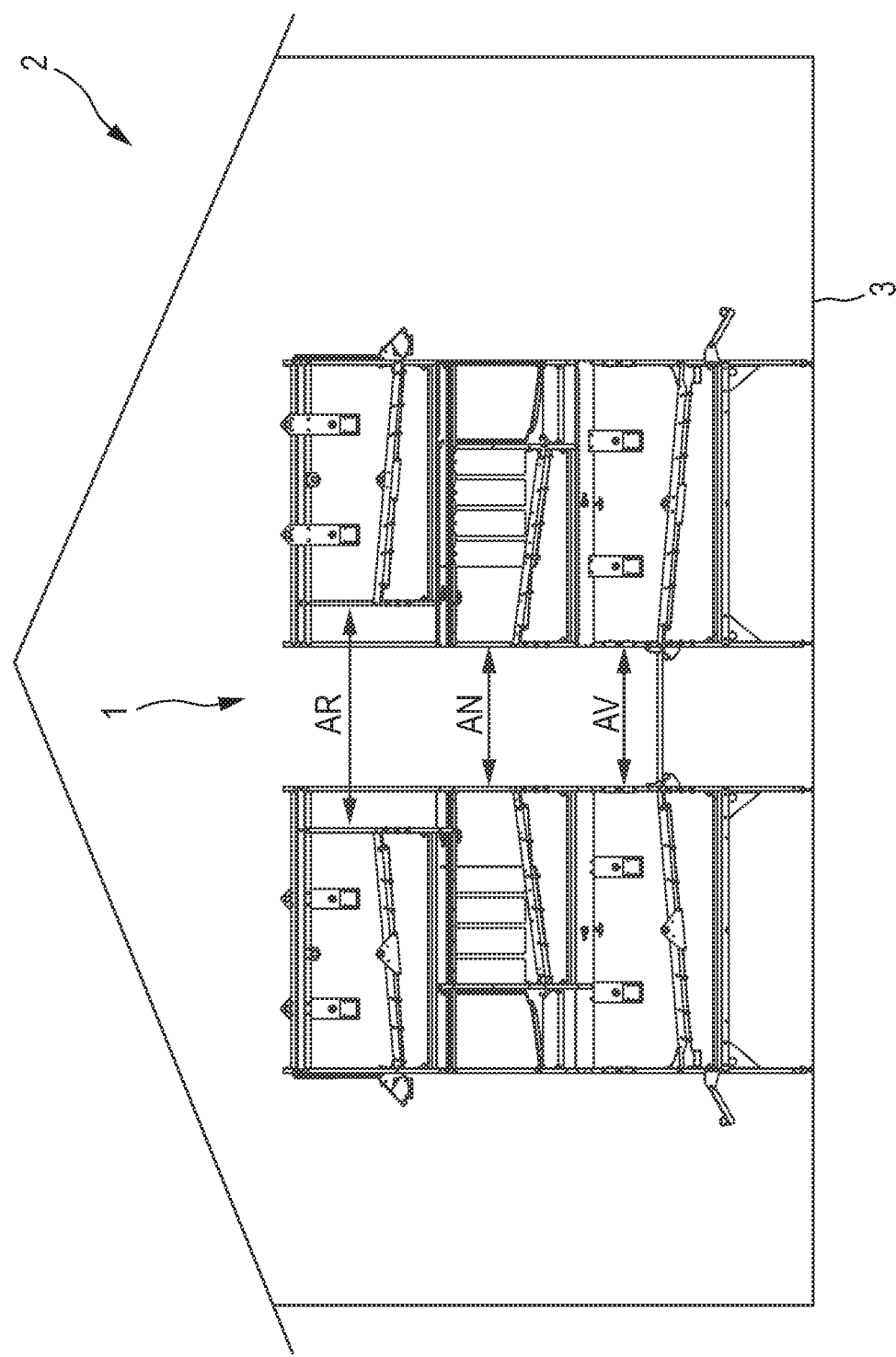

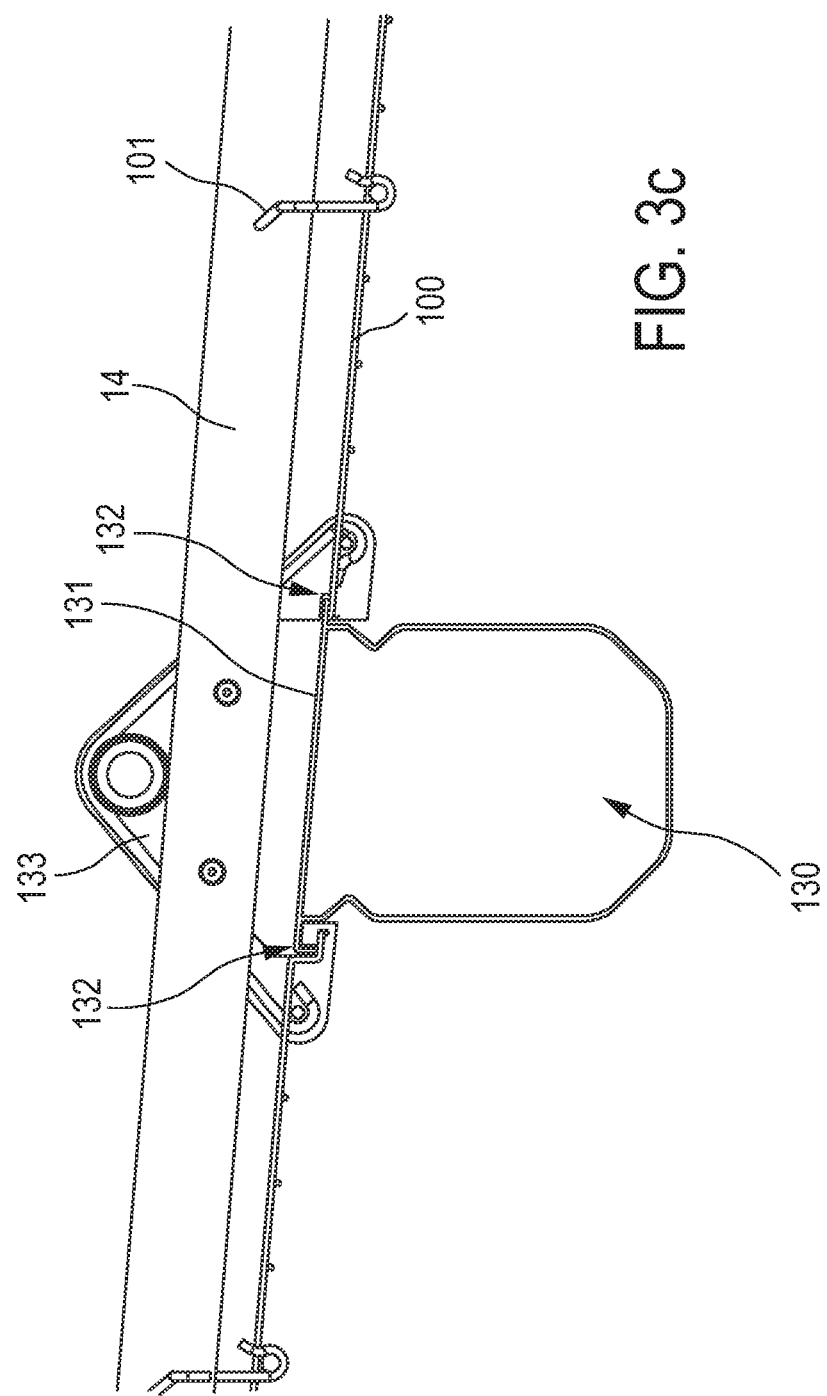

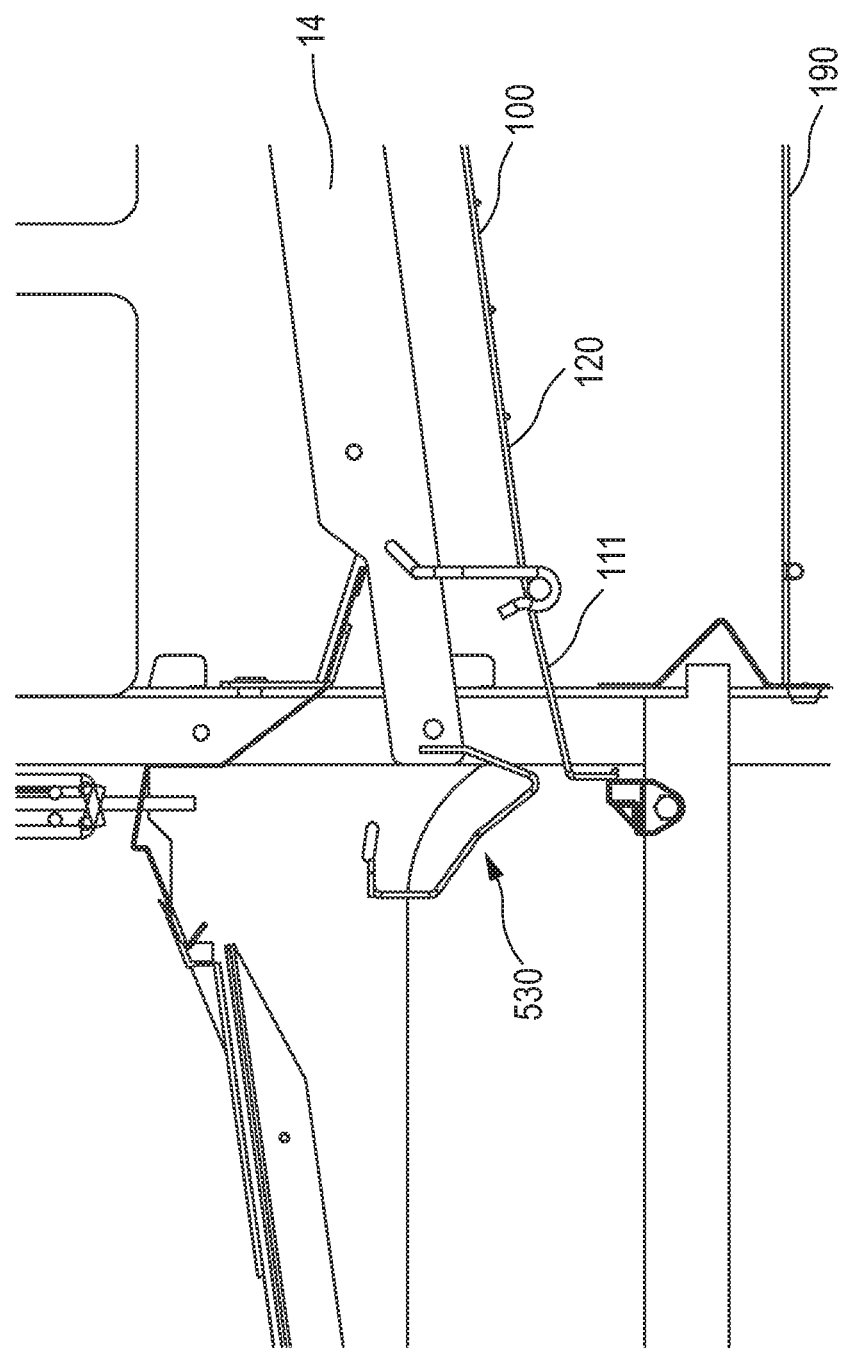

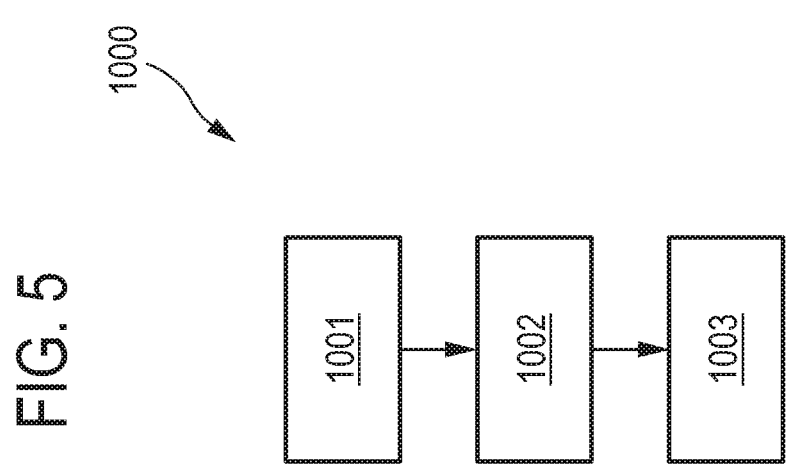

AVIARY ARRANGEMENT FOR POULTRY ANIMALS AND METHOD OF POULTRY HUSBANDRY

CROSS-REFERENCE TO FOREIGN PRIORITY APPLICATION

The present application claims the benefit under 35 U.S.C. §§ 119(b), 119(e), 120, and/or 365(c) of PCT/EP2019/064209 filed May 31, 2019, which claims priority to Luxembourg Application No. LU100811 filed Jun. 1, 2018.

FIELD OF THE INVENTION

The invention relates to an aviary arrangement for poultry and to a method for poultry management.

BACKGROUND OF THE INVENTION

Open management systems, such as aviary systems, and closed management systems, such as cage systems, are known in poultry management. While closed management systems generally permit a high stocking density of poultry, the stocking density in open management systems is generally significantly lower.

Known attempts for increasing the stocking densities in aviaries have features of closed systems and have, for example, a plurality of identically provided tiers between which the poultry can freely move. Although such systems have a greater stocking density in comparison to open management systems and provide no cages unlike in closed systems, various disadvantages are associated even with such systems. These include, for example, management problems, such as in respect of the litter quality, in respect of the distribution of the animals, and/or in respect of the inspection of the animals. Furthermore, the eggs are frequently distributed nonuniformly in the longitudinal direction of the tiers and also within the tiers, as a result of which quality problems may arise with the eggs, in particular, where particularly large amounts of eggs come together whereupon cracked and/or broken eggs may thereby arise. Furthermore, it is true that the supply of feed and water and also perches, nests, and egg collection are generally in each case arranged in the tiers of such systems. However, such a distribution of the functional regions often does not correspond to natural animal behavior, and, despite identically provided tiers, unequal acceptance and utilization of the tiers occurs.

Existing systems for poultry management and nests for this purpose are known, for example, from WO 2017/139590 A1 or WO 2005/0990448 A1.

It is, therefore, an object of the present invention to provide an aviary arrangement for poultry and a method for poultry management, which aviary arrangement and method reduce or eliminate one or more of the disadvantages mentioned. In particular, it is an object of the present invention to provide an aviary arrangement for poultry and a method for poultry management, which aviary arrangement and method permit an open management system with high stocking density and at the same time contribute to increased animal welfare.

SUMMARY OF THE INVENTION

This object is achieved according to the invention by an aviary arrangement for poultry, comprising a first aviary row and a second aviary row, and a bridge which connects the first aviary row and the second aviary row, wherein the first aviary row has a first service tier, a first nest tier and a first resting tier, each having an inclined animal roosting floor and a manure conveying device arranged therebelow, wherein the first resting tier is arranged above the first nest tier and the first service tier is arranged below the first nest tier, and the first nest tier has a first nest and a first egg conveying device, and wherein the second aviary row has a second service tier, a second nest tier and a second resting tier, each having an inclined animal roosting floor and a manure conveying device arranged therebelow, wherein the second resting tier is arranged above the second nest tier and the second service tier is arranged below the second nest tier, and the second nest tier has a second nest and a second egg conveying device, and wherein the bridge is arranged above the manure conveying device of the first service tier and/or above the manure conveying device of the second service tier, and preferably has a bridge floor for receiving litter.

The aviary arrangement serves for management of poultry and is particularly suitable for arranging on a house floor in a poultry house. The aviary arrangement comprises a first and a second aviary row. An aviary row preferably has a substantially horizontal row longitudinal direction and a substantially horizontal transverse direction which is preferably oriented orthogonally to the row longitudinal direction. An extent of an aviary row in the row longitudinal direction is preferably greater than the extent of the aviary row in the transverse direction. An aviary row can be composed, for example, of a plurality of segments which are lined up next to one another in the row longitudinal direction.

Relative details and positional data, such as, for example, horizontally, top, bottom, etc., are understood here as meaning in particular with reference to the operating state of an aviary arrangement.

Each of the two aviary rows of the aviary arrangement in each case comprises a service tier, a nest tier arranged above the service tier, and a resting tier arranged above the nest tier. The various tiers may also be referred to as various functional regions which, for example, carry out the servicing function, in particular, feed and water uptake, the function of egg deposition in nests, and the resting or sleeping function.

The two aviary rows having the three tiers in each case are preferably arranged spaced apart from each other in the transverse direction.

Each of the tiers has an inclined animal roosting floor and a manure conveying device arranged therebelow. The animal roosting floors can be designed, for example, as a lattice grating. The manure conveying devices can preferably be designed as endless conveyor belts, for example, as manure belts, on which animal excrement can not only be caught, but can also be transported away, preferably in the row longitudinal direction. The arrangement of manure conveying devices under the animal roosting floors avoids soiling of the tiers located therebelow. An inclined configuration of the animal roosting floors permits the eggs on the animal roosting floors to roll away and, therefore, permits easier collection of the eggs.

The two nest tiers each have a nest and an egg conveying device, for example, an egg belt. The egg conveying devices are preferably designed as endless conveyor belts with which the eggs can be collected and/or can be transported away, preferably in the row longitudinal direction.

In this description, the two aviary rows of the aviary arrangement are referred to by first and second aviary row, and similarly, for example, the tiers of the two aviary rows are referred to by first and second service tier, etc. The first and second aviary row are preferably of substantially identical design, in particular, are substantially mirror-symmetrical with respect to each other. Many elements, such as, for example, the animal roosting floors, manure conveying devices, or further elements, are preferably also substantially identical for the two aviary rows. For simplification, preferred refinements and advantages of the aviary rows and of their further elements and features are, therefore, described in this text without reference being explicitly made in each case to the first or the second aviary row or the respective first and second element of said aviary rows. Unless stated otherwise, however, the respective descriptions also relate to the first and to the second aviary row or to the first and to the second elements and components etc. of said rows.

The first and/or the second service tier are preferably spaced apart from the house floor, for example, by means of an elevated configuration. A distance between the manure conveying devices of the two service tiers and a house floor is preferably dimensioned in such a manner that poultry can pass through an aviary row below the service tier.

The two aviary rows are connected to each other by a bridge, wherein said bridge, in particular, bridges the distance between the two aviary rows in the transverse direction. The bridge is designed, in particular, so as to be walkable on by poultry, and, therefore, poultry can pass from the first aviary row over the bridge to the second aviary row, and vice versa.

The bridge preferably has a bridge floor for receiving litter. The animals can thereby not only use a house floor, which is customarily provided with litter, as a scratching surface, but also the bridge since the latter can be covered with litter. The bridge can thereby serve as a functional region and/or care region in which the poultry, for example, can take a dust bath and/or can undertake scratching.

Furthermore preferably, the bridge has a bridge floor with a closed or a substantially closed surface, such as, for example, a perforated surface. This is preferred, in particular, so that manure and/or other soiling does not pass downward through the bridge floor or at least is obstructed therefrom.

The bridge preferably extends in the transverse direction between the first and the second aviary row and furthermore preferably in the row longitudinal direction over part or the entire extent of the aviary arrangement. In particular, in the row longitudinal direction, the bridge can also have one or more interruptions. The bridge can be designed, for example, as a lattice grating on which a closed surface, for example, in the form of a mat or plate, is arranged. The bridge can also be designed as a substantially closed element.

The two aviary rows apart from the bridge preferably do not have any further connections which can be walked upon by poultry. In particular, the two poultry rows apart from the bridge do not have any further planar connecting bridges, as are provided, for example, in what are referred to as portal systems in which the poultry can reach various regions via portal bridges arranged in the upper region or can change to and from between said regions.

The bridge is arranged above the manure conveying devices of the first and/or second service tier. Furthermore preferably, the bridge is arranged below the nest tier, in particular, below a manure conveying device and/or below an animal roosting floor of the first and/or second nest tier. The bridge is preferably arranged substantially level with the animal roosting floor of the first and/or second service tier.

The bridge is preferably also designed so as to be walkable on by people. In this manner, the bridge can advantageously serve not only as a roosting surface for the poultry, but also can be used by staff as an inspection and/or service aisle from which, for example, an inspection of the aviary arrangement, in particular, of the nest and resting tiers, is possible.

The two sides of the two aviary rows that run parallel to the row longitudinal direction and face the bridge may also be referred to as inner sides. The two sides of the two aviary rows that preferably run parallel to the row longitudinal direction and face away from the bridge may also be referred to as outer sides.

The first and/or the second service tier preferably each has/have at least one landing aid, for example in the form of a perch. This can make it easy for poultry to reach the respective service tier from the house floor. The landing aids are preferably arranged parallel to the outer sides of the aviary rows and are spaced apart therefrom in the transverse direction. Furthermore preferably, the landing aids are arranged in the vertical direction below the animal roosting floors of the service tiers.

The nest tiers are preferably configured in such a manner that they can be reached from the bridge and/or the service tiers and/or the resting tiers. In particular, it is preferred that the nest tiers can be reached only from the bridge and/or from the service tiers and/or from the rest tiers and/or, in particular, cannot be reached by the poultry directly from the house floor. Since the house floor is generally covered with litter, soiling of the nests and, therefore, also soiling of the eggs laid therein can thereby be reduced when the poultry first have to pass through a service tier, for example, and already lose litter adhering to the feet before they reach the nest tier.

The first and second service tier preferably in each case have a plurality of feeding devices and in each case a plurality of drinkers and in each case a plurality of perches. Furthermore, it is preferred for the first and second nest tier to each have a plurality of drinkers. It is preferred for the first and second resting tier in each case to have a plurality of feeding devices and in each case a plurality of perches. Furthermore preferably, the first and second nest tier in each case have more drinkers than the respective first and second service tier. It is also preferred for the first and second resting tier to in each case have more perches than the respective first and second service tier.

These configurations of the respective functional regions are preferred since they increase the animal welfare and approximate the natural behavior of the animal. For example, poultry prefer resting positions situated high up, and, therefore, the resting tiers are arranged at the upper end of the aviary rows and have a plurality of perches arranged at the top. The service tiers serve in particular also as activity and/or roosting regions in which the animals can take up feed and water. The nest tiers preferably have an increased number of drinkers in order to allow the natural behavior of the animals of drinking in the morning after resting—before and/or after visiting a nest.

The aviary arrangement described herein is based, in particular, on the findings illustrated below and in particular has the advantages illustrated below.

The provision of various functional regions in the form of various tiers in each of the two aviary rows complies with the natural behavior of the animals and can, therefore, increase the animal welfare, with it being possible at the same time to increase the stocking density.

A connection of the two aviary rows by means of a bridge, the bridge floor of which is preferably designed for receiving litter, furthermore has the advantage that the aviary arrangement with the bridge has a functional region and/or care region which the poultry can use as a scratching region and/or for a dust bath. This is particularly of advantage in a familiarization phase of the poultry. In such a familiarization phase, it is customary to introduce the poultry to the aviary arrangement. This means that the aviary arrangement is closed, and, therefore, the poultry cannot leave the aviary arrangement and cannot enter the house floor. Said introduction phase serves for familiarization of the poultry with the aviary arrangement. Said introduction phase is generally limited in time. However, it complies with natural animal behavior and reinforces the animal welfare even if the poultry during said introduction phase have the option of scratching in litter and of taking a dust bath. Since the house floor which is customarily covered with litter cannot be reached by the poultry during the introduction phase, poultry in conventional management systems also do not have the possibility of scratching or of taking a dust bath during the introduction phase. By means of the preferred provision of the bridge with a bridge floor for receiving litter, the poultry have a scratching region with litter even during the introduction phase in the aviary arrangement described here.

The arrangement of two aviary rows and the connection thereof via a bridge furthermore has the advantage that the poultry can change between the rows, which can increase the movement and activity of the poultry.

By means of the provision of nest tiers with nests and egg conveying devices, the natural behavior of animals as per a correspondingly designed functional region is likewise satisfied. At the same time, the quality of the eggs can thereby be increased and the soiling thereof reduced since the eggs can be collected and transported away via the egg conveying devices.

According to a preferred embodiment, it is provided that the animal roosting floors of the first aviary row are inclined in one direction in relation to the manure conveying devices of the first aviary row and/or the animal roosting floors of the second aviary row are inclined in one direction in relation to the manure conveying devices of the first aviary row.

An animal roosting floor is preferably inclined only in a single direction in relation to the manure conveying device located therebelow. This, therefore, means, in particular, that there are no different directions of inclination, as, for example, in the case of a pitched roof, which form a highest point or ridge from which regions are inclined dropping in different directions.

The inclination only in one direction leads to eggs rolling away only in one direction and, therefore, eggs rolling away also only arrive on one side of the animal roosting floors. An egg conveying device and/or an egg collecting device, therefore, also only has to be arranged on one side of an animal roosting floor, which can reduce the costs. An animal roosting floor inclined only in one direction can be inclined to different degrees in sections, for example, in order to increase or to reduce the rollaway speed of the eggs in certain sections.

The animal roosting floors are preferably inclined dropping toward the outer sides.

In a preferred embodiment, it is provided that one, more than one, or all of the animal roosting floors each have an air duct which is arranged below the respective animal roosting floor.

The air duct is preferably arranged centrally below the respective animal roosting floor. An air duct preferably serves to output air in the direction of a manure conveying device in order to dry the poultry excrement located thereon. A central arrangement of an air duct below an animal roosting floor has the advantage that the air emerging from the air duct can be distributed as uniformly as possible, in particular, in the case of manure conveying devices which are each arranged centrally under the animal roosting floors and/or have substantially the same width as the animal roosting floors.

It is furthermore preferred that an upper side of the air duct forms part of the animal roosting floor and/or an upper side of the air duct is formed in a flat and/or inclined manner.

This configuration of the upper side of the air duct has the advantage that the upper side of the air duct can be directly entered by the poultry. This has the advantage that the movement of the poultry carries away soiling and excrement located on the upper side of the air duct. Said soiling and the excrement can then pass via the adjacent regions of the animal roosting floor, which is preferably in the form of a grating, onto the manure conveying device located therebelow. In comparison to an arrangement of the air duct in which the upper side of the air duct is also arranged below the animal roosting floor, the arrangement described here has the advantage that fewer accumulations, if any at all, form on the upper side of the air duct. Such accumulations on the upper side of an air duct that cannot be carried away by movement may lead, for example, to an increased outlay on cleaning and/or to a higher risk of infection if said accumulations are not regularly removed by the staff.

Furthermore, it is preferably provided that a transition between an upper side of the air duct and an adjacent region of the animal roosting floor is designed to be barrier-free for rolling eggs.

It is preferred, in particular, that the transition between an upper side of the air duct and an adjacent region of the animal roosting floor is formed in a substantially flat manner and/or at substantially the same height. A barrier-free transition has the advantage that the eggs are not obstructed from rolling away and/or are damaged as little as possible, if at all.

A preferred development is distinguished in that an egg rollaway region of the animal roosting floor of the first nest tier, said egg rollaway region facing the first egg conveying device, and/or an egg rollaway region of the animal roosting floor of the second nest tier, said egg rollaway region facing the second egg conveying device, has/have a greater inclination than an adjacent region of the respective animal roosting floor.

A greater inclination of an egg rollaway region of the animal roosting floor, said egg rollaway region facing the egg conveying device, can have the effect that eggs roll away more reliably into said egg rollaway region and reach the egg conveying device.

According to a preferred embodiment, it is provided that the first nest tier and/or the second nest tier has/have an egg holding device with an egg holding element.

The egg holding element is preferably movable from a holding position into a release position and furthermore preferably is movable back from the release position into the holding position. The egg holding element is preferably designed to obstruct eggs which are located on the egg rollaway region in the holding position from rolling away onto the egg conveying device and to allow eggs which are located on the egg rollaway region in the release position to roll away onto the egg conveying device.

The provision of an egg holding element has various advantages. By means of the egg holding device, for example, eggs laid in the nests of a nest tier can initially be held, preferably by the egg holding element in the holding position, before said eggs roll away onto the egg conveying device. By this means, the eggs are protected from rolling away onto the egg conveying device in an uncontrolled manner.

The egg holding element can be designed, for example, as a wire or a cable and can furthermore be placed under tension preferably in the holding position. The egg holding element, in particular, in the holding position, is preferably spaced apart above the egg rollaway region at a height above the egg rollaway region that is smaller than an average height of the eggs. The eggs can thereby be stopped from rolling away by the egg holding element. The egg holding element can be brought, for example, by controlled relaxation, into the release position, for example, by the tension in the wire or cable being reduced or entirely released. By this means, the egg holding element can approach the egg rollaway region and the eggs can roll away beyond the egg holding element. The egg holding element can also be brought, for example, by raising, into the release position, for example, by the egg holding element being guided upward along a guide, specifically preferably to a height which is greater than an average height of the eggs. The eggs can thereby roll away under and through the egg holding element.

By this means, there are firstly advantages in respect of a reduction in the proportion of broken and cracked eggs. A further advantage is afforded by the fact that the eggs can first dry after being laid while they are being held before they roll onto the egg conveying device. In particular, if a wide egg conveying device is used in the nest tier, because of the multiplicity of eggs arising because of the arrangement of the nests, the drying of the eggs before they reach the egg conveying device is of advantage since dust and other particles from the egg conveying device thus do not adhere to the still moist shell of the eggs. In particular, in the case of wide egg conveying devices, eggs can often roll away through a full revolution or more before they stop and then dry on the egg conveying device and accordingly receive pronounced rolling tracks. The avoiding or reducing of such rolling tracks increases the egg quality.

In a further preferred embodiment, it is provided that the first and/or the second egg conveying device has/have a covering which can be walked on by poultry.

The covering of the egg conveying device is preferably spaced apart in the vertical direction from the egg conveying device, and, therefore, there is sufficient space below the covering for the collecting and conveying of the eggs. By means of the configuration of the covering in such a manner that it can be walked on by poultry, the surface above the egg conveying device that is covered by the covering can be used as a useful surface for the poultry.

The covering is preferably accessible to the poultry from the outer sides. Furthermore preferably, the covering is formed with a substantially closed surface in order to prevent or at least to reduce soiling of the eggs.

A further preferred development is distinguished in that the first and/or the second resting tier and/or the first and/or the second service tier each has/have an egg collecting device.

By means of the configuration of the various tiers of an aviary row, most eggs accrue in the nests of the nest tier and are collected and transported away there via the egg conveying devices. However, eggs may also be laid outside the nests and also outside the nest tier. Such eggs which are laid, for example, in the service tier and/or the resting tier are also referred to as system eggs. Since all of the animal roosting floors are inclined, such system eggs also roll away on the inclined animal roosting floors. The resting tiers and/or the service tiers, therefore, preferably each also have an egg collecting device. As a rule, the latter can be dimensioned to be smaller than the egg conveying device of the nest tier since, as a rule, significantly fewer system eggs arise than eggs laid in the nest tier. The egg collecting devices can likewise be designed, for example, as endless conveying devices, for example, likewise as egg belts. As a rule, the egg collecting devices are designed to be significantly narrower than the egg conveying devices of the nest tiers. The egg collecting devices can preferably likewise convey eggs along the row longitudinal direction.

The egg collecting devices and/or egg conveying devices are preferably arranged on the outer sides of the animal roosting floors and/or so as to face the outer sides.

In a preferred embodiment, it is provided that the entrances to the aviary arrangement have blocking devices which are designed to block the passage of poultry.

As already described previously, the poultry can be introduced to the aviary arrangement in the familiarization phase. This serves for animal welfare in order to enable the poultry to become more familiar with the aviary arrangement. For this purpose, the entrances to the aviary arrangement, through which the poultry can enter and leave the aviary arrangement, are blocked. The entrances to the aviary arrangement are generally accessible from the house floor or the landing aid. For this purpose, corresponding blocking devices are provided which block the passage of poultry. The blocking devices can be designed, for example, as gratings and/or flaps and/or rigid curtains or the like.

It may also be preferred that the blocking devices are arranged such that they can be blocked on one side. For example, the blocking devices can continue to permit the passage of poultry into the aviary arrangement, but can also block the passage of poultry out of the aviary arrangement. It is thereby easier during the introduction to move the poultry into the aviary arrangement. It can likewise be preferred that the blocking devices are designed to permit the passage of poultry on one side in the outlet direction, but to block the entry. This may be preferred, for example, if the poultry are intended to leave the aviary arrangement when being taken out.

A preferred development is distinguished in that the first resting tier is set back in relation to the first nest tier and/or in relation to the first service tier, and/or the second resting tier is set back in relation to the second nest tier and/or in relation to the second service tier.

Preferably, a distance between the first and second resting tier is larger than a distance between the first and second nest tier and/or than a distance between the first and second service tier, in particular, at least 5% larger, for example at least 10% larger, preferably at least 15% larger.

In these refinements, it is preferred, in particular, that the upper tiers are set back in relation to the lower tier(s), in particular, with respect to the inner sides of the aviary rows. The space above the bridge between the aviary rows thereby becomes wider upward. This has various advantages. First, by means of such a stepped configuration of the tiers, the poultry can, in particular, more easily reach the upper resting tiers since they can readily reach the latter from the bridge, for example, by means of an intermediate landing in the nest tier. A further advantage arises if the bridge is used as a service aisle for staff since there is thus more freedom of movement, for example, in the chest region of the staff.

According to a further preferred embodiment, it is provided that a depth and/or a breadth of the first and/or of the second nest is/are variable, and/or one, two, three, or more nest delimitations are arranged releasably and/or are usable flexibly. A nest floor can preferably be designed as a removable nest mat. The nest mat here can preferably have a closed or a substantially closed surface, such as, for example, a perforated surface. Nest mats having relatively large openings are also conceivable since a sufficient degree of distinction from the adjacent wire lattice floor is crucial for the perception as a nest by the poultry.

Nests can preferably be entirely or partially removable. For example, within an aviary row, the number and/or the size of the nests and/or the placing thereof along the aviary row can thereby be varied. By means of this variability in respect of the number and/or size and/or positioning of the nests, the aviary arrangement can be adjusted individually to poultry groups and the preferences thereof and the behavior thereof. Furthermore, by corresponding changes of the nests, the attractiveness of the nests can be increased and can likewise be adapted to the poultry groups. The nest delimitations can be configured, for example, as variable partitions and/or separating gratings and/or curtains. The nests can thereby be defined in a variable manner by an operator of the poultry house and can also be changed even after commissioning. For example, poultry may accept a designated configuration, in particular, of nests, with difficulty, if at all. By means of the described configuration, the nest surface can be changed even after commissioning into a useful surface, and vice versa. Furthermore, by removal and/or fitting of nest delimitations and/or nest mats, the attractiveness of the nests can be increased, depending on which type of nests are the most acceptable to the poultry. Furthermore, by means of the variability of the nests, the useful surface can also be adapted and increased, if required, as a result of which a higher stocking density becomes possible.

A nest depth in the transverse direction is preferably at least 580 mm, in particular at least 600 mm, for example more than 650 mm. It is preferred for a nest depth in the transverse direction to correspond to at least 30%, in particular at least 35%, for example at least 40%, of a tier depth of the nest tier in the transverse direction.

Further advantageous variant embodiments of the previously described aviary arrangement emerge from a combination of the preferred features discussed here.

According to a further aspect of the invention, the object mentioned at the beginning is achieved by a poultry house having at least one previously described aviary arrangement.

According to a further aspect of the invention, the object mentioned at the beginning is achieved by a method for poultry management, comprising: arranging at least one previously described aviary arrangement for poultry in a poultry house, providing litter on the house floor and/or on the bridge of the aviary arrangement, and putting poultry in the poultry house.

The method can be developed by introducing the poultry inside the aviary arrangement and blocking the entrances to the aviary arrangement for the passage of poultry.

The method and the developments thereof have features or method steps which make them suitable, in particular, to be used with a previously described aviary arrangement and the developments thereof.

For the advantages, variant embodiments and embodiment details of said further aspects of the invention and the developments thereof, reference is made to the preceding description with regard to the corresponding device features.

According to a further aspect of the invention, the object mentioned at the beginning is achieved by the use of a previously described aviary arrangement for poultry management and/or in a previously described poultry house and/or in a previously described method.

BRIEF DESCRIPTION OF THE DRAWINGS

Preferred exemplary embodiments will be described by way of example with reference to the attached figures, in which:

FIG. 1a is a schematic three-dimensional illustration of an example of an aviary arrangement for poultry;

FIG. 1b is the aviary arrangement according to FIG. 1a with poultry movements drawn in;

FIG. 2b is the aviary arrangement according to FIG. 2a in a poultry house;

FIG. 2c is the aviary arrangement according to FIG. 2a with poultry movements drawn in;

FIG. 3b is a schematic cross-sectional illustration of the animal roosting floor with an air duct according to FIG. 3a;

FIG. 3c is an enlarged detail from FIG. 3b;

FIG. 4a is an enlarged schematic cross-sectional illustration of a detail from a nest tier with an egg holding device;

FIG. 5 is a schematic illustration of a method for poultry management.

DETAILED DESCRIPTION OF THE EMBODIMENTS

Figure 1B:
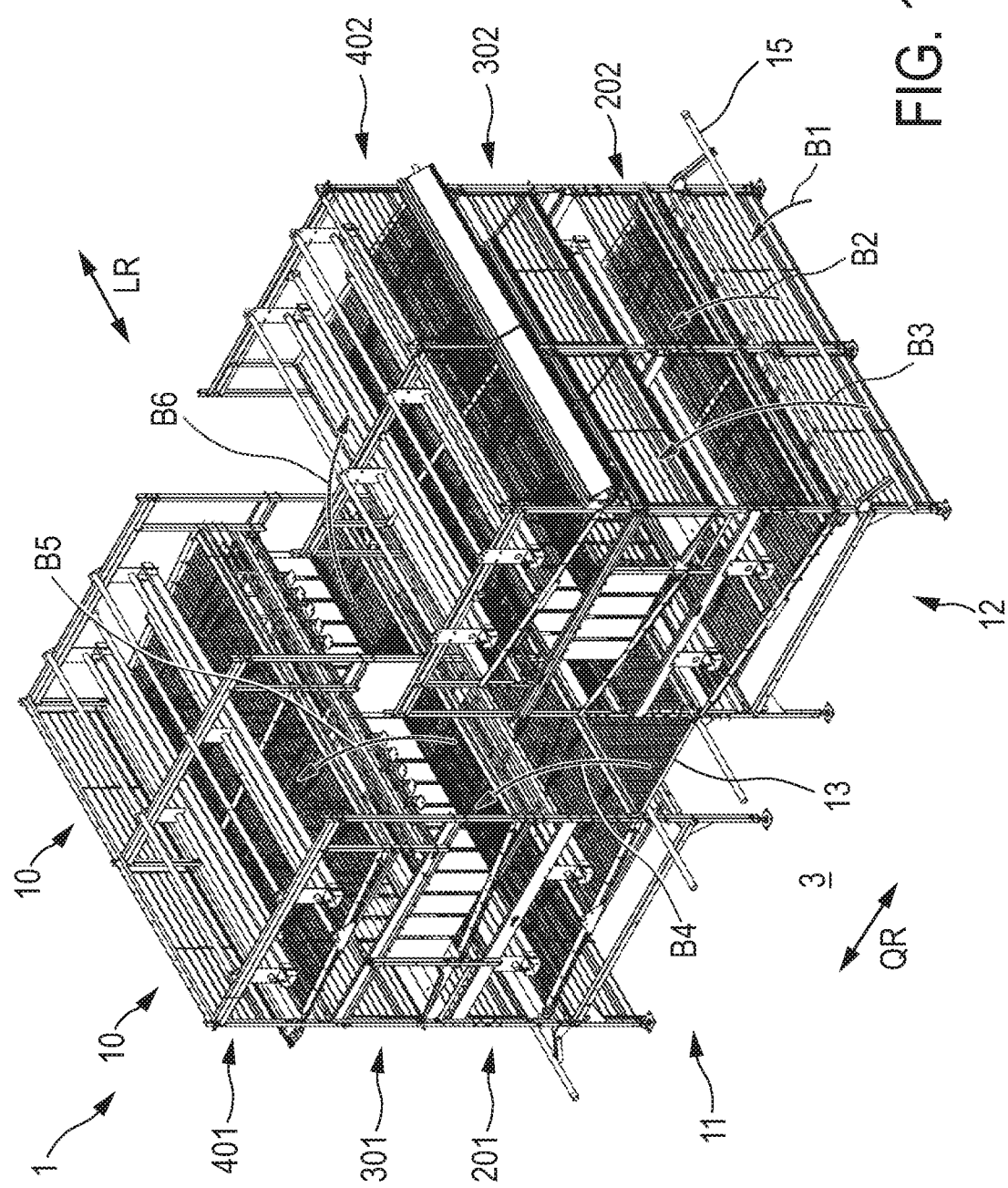

In the Figures, identical or essentially functionally identical elements are provided with the same reference signs. General descriptions relate as a rule to all of the embodiments unless differences are explicitly stated.

FIG. 1a shows two segments 10 for an aviary arrangement 1 with a first aviary row 11 and a second aviary row 12. In order to form a larger aviary arrangement 1, a plurality of segments 10 can be arranged next to one another and connected to one another, in particular, in order to extend the aviary arrangement 1 in the row longitudinal direction LR. In the transverse direction QR oriented orthogonally to the row longitudinal direction LR, the two aviary rows 11, 12 are connected to a bridge 13. As can be seen, in particular, in FIG. 2b, the aviary arrangement 1 for poultry serves for arranging on a house floor 3 of a poultry house 2. In smaller houses 2, one aviary arrangement 1 can be arranged in a poultry house 2. However, it is also possible for a plurality of aviary arrangements 1 to be arranged next to one another in larger houses 2.

The first aviary row 11 has a first service tier 201, a first nest tier 301 and a first resting tier 401. The second aviary row 12 likewise has a second service tier 202, a second nest tier 302, and a second resting tier 402. The two service tiers 201, 202 are the lowermost tiers, the two resting tiers 401, 402 are the uppermost tiers. The two nest tiers 301, 302 are arranged between the respective service tiers 201, 202 and resting tiers 401, 402. The service tiers 201, 202 are arranged spaced apart from the house floor 3, for example, as shown in the Figures, via standing feet of the supporting framework 14 in a stand construction with which the dissipation of load and stability of the aviary arrangement 1 are ensured.

In the first and second service tiers 201, 202, two feeding devices 18 and drinkers 19 and a plurality of perches 16 are in each case provided. In the first and second nest tiers 301, 302, nests 601, 602, an egg conveying device 501, 502 in the form of an egg belt and drinkers 19 are in each case provided. In the first and second resting tiers 401, 402, two feeding devices 18 and a plurality of perches 16 arranged at different heights are in each case provided. The various tiers serve as various functional regions for servicing, in particular, feed and water uptake, for egg deposition in nests 601, 602, and for resting or sleeping.

Each of the tiers has an animal roosting floor 100 which is inclined in one direction and has a manure conveying device 190 arranged therebelow in the form of a manure belt. The animal roosting floors 100 are inclined dropping toward the outer sides AS of the aviary rows 11, 12. The inclination of the animal roosting floors 100 in only one direction and dropping toward the outer sides AS of the aviary rows 11, 12 can readily be seen, for example, in FIG. 2a. A manure belt 190 on which the excrement and soiling can be collected and transported away is in each case arranged below the animal roosting floors 100.

Air ducts 130 are arranged centrally below the animal roosting floors 100. For simplification of the illustration, no air ducts are shown in FIGS. 1a-b and 2a-d. However, the aviary arrangements 1 of FIGS. 1a-b and 2a-d also have air ducts. A preferred configuration and arrangement of air ducts 130 is shown in FIGS. 3a-c.

An air duct 130 outputs air in the direction of a manure belt 190 in order to dry the poultry excrement located thereon. A central arrangement of an air duct 130 below an animal roosting floor 100 is particularly efficient because of the uniform distribution of the air emerging from the air duct 130.

Figure 3A:
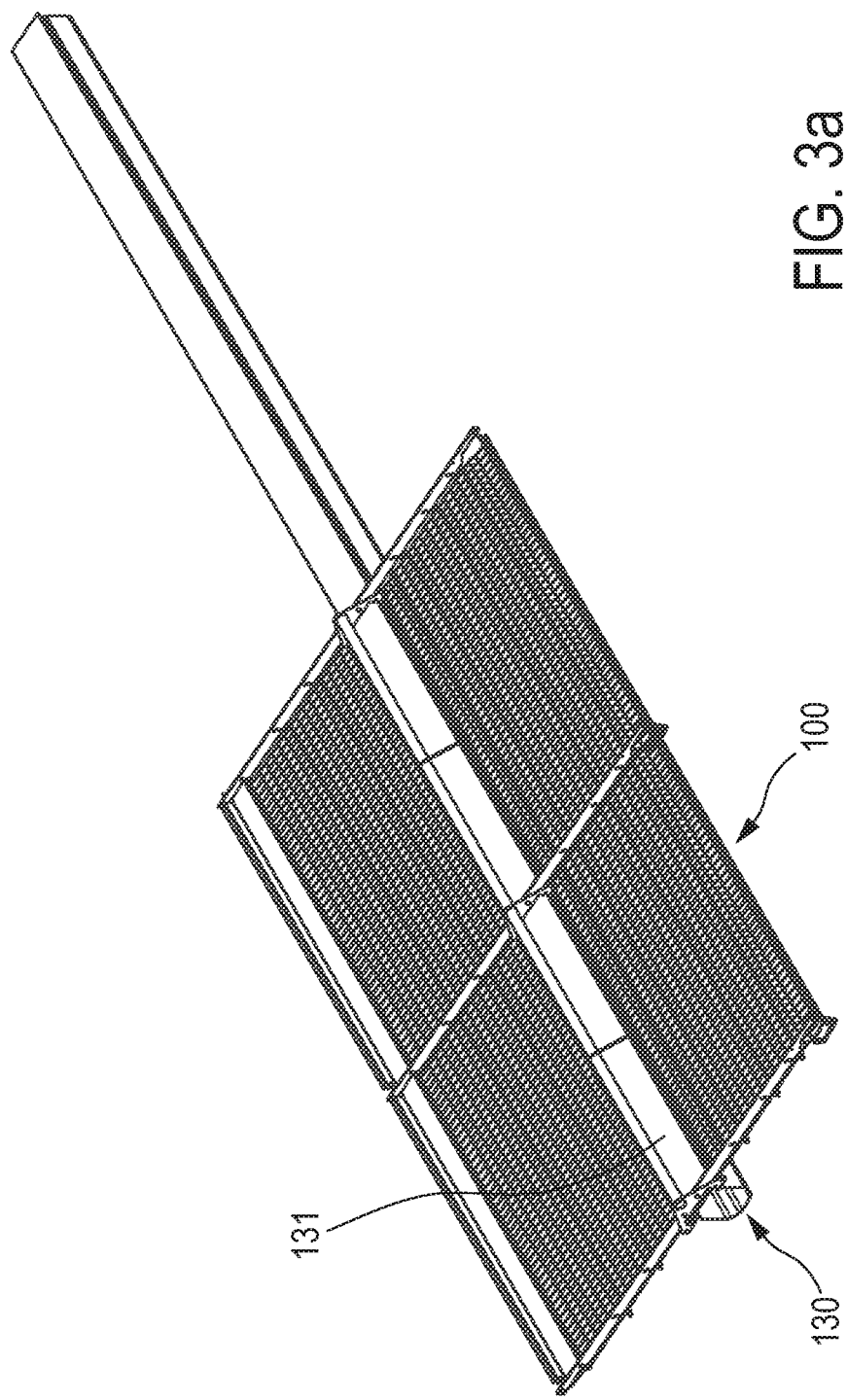
FIG. 3a is a schematic three-dimensional illustration of an example of an animal roosting floor with an air duct.
Figure 3B:
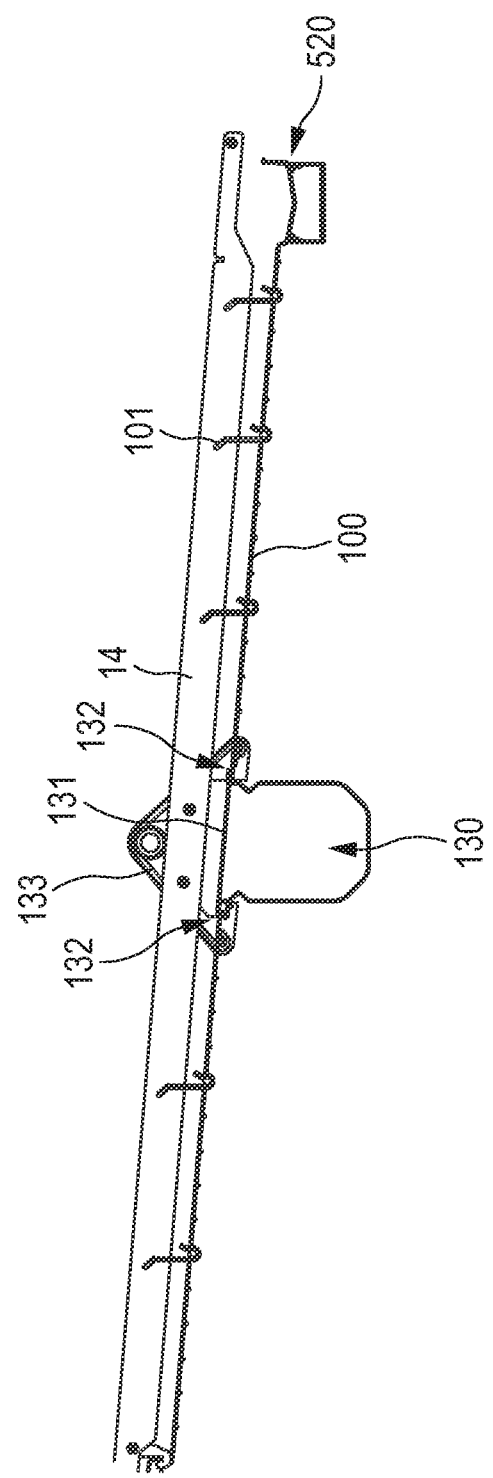

The upper side 131 of the air duct 130 is flat and inclined and forms part of the animal roosting floor 100, as can be seen, in particular, in FIGS. 3a-c. The upper side 131 of the air duct 130 can thus be entered directly by the poultry. The movement of the poultry thus causes soiling and excrement located on the upper side 131 of the air duct 130 to be carried away.

The animal roosting floor 100 is fastened to the supporting framework 14 in a stand construction via wire hooks 101. The air duct 130 is fastened to the supporting framework 14 in a stand construction via fastening elements 133. The transitions 132 between the upper side 131 of the air duct 130 and the adjacent regions of the animal roosting floor 100 are designed in a flat manner or substantially at the same height, therefore, to be barrier-free for rolling eggs in order not to obstruct the eggs from rolling away and/or to damage the eggs as little as possible, if at all.

The bridge 13 is arranged above the manure belts 190 of the first and second service tier 201, 202 and essentially lies level with the animal roosting floors 100 of the service tiers 201, 202, on the inner sides IS thereof facing the bridge 13. Litter which is carried away from the bridge 13 by the poultry can thereby pass through the animal roosting floors 100, which are preferably designed as a lattice grating, of the service tiers 201, 202 onto the manure belts 190 located therebelow and can be transported away.

The two resting tiers 401, 402 are set back with respect to the inner sides IS of the aviary rows 11, 12 in relation to the two nest tiers 301, 302 and in relation to the two service tiers 201, 202. The tier depth of the service tiers 201, 202 and of the nest tiers 301, 302, which is denoted in FIG. 2d by lower tier depth ET1, is at least 15% greater than the tier depth of the resting tiers 401, 402, which tier depth is denoted in FIG. 2d by upper tier depth ET2. A distance AR between the first and second resting tier 401, 402 is, therefore, also produced, said distance being correspondingly greater than the distance AN between the first and second nest tier 301, 302 and than the distance AV between the first and second service tier 201, 202. An overall depth GT of the aviary arrangement 1 is preferably larger by at least 10%, in particular at least 15%, for example, at least 22%, than twice a lower tier depth ET1.

The space above the bridge 13 between the aviary rows 11, 12 upward thus becomes wider, and, therefore, the poultry can more easily reach the upper resting tiers 401, 402 and the service aisle permits more freedom of movement for staff.

Figure 2A:
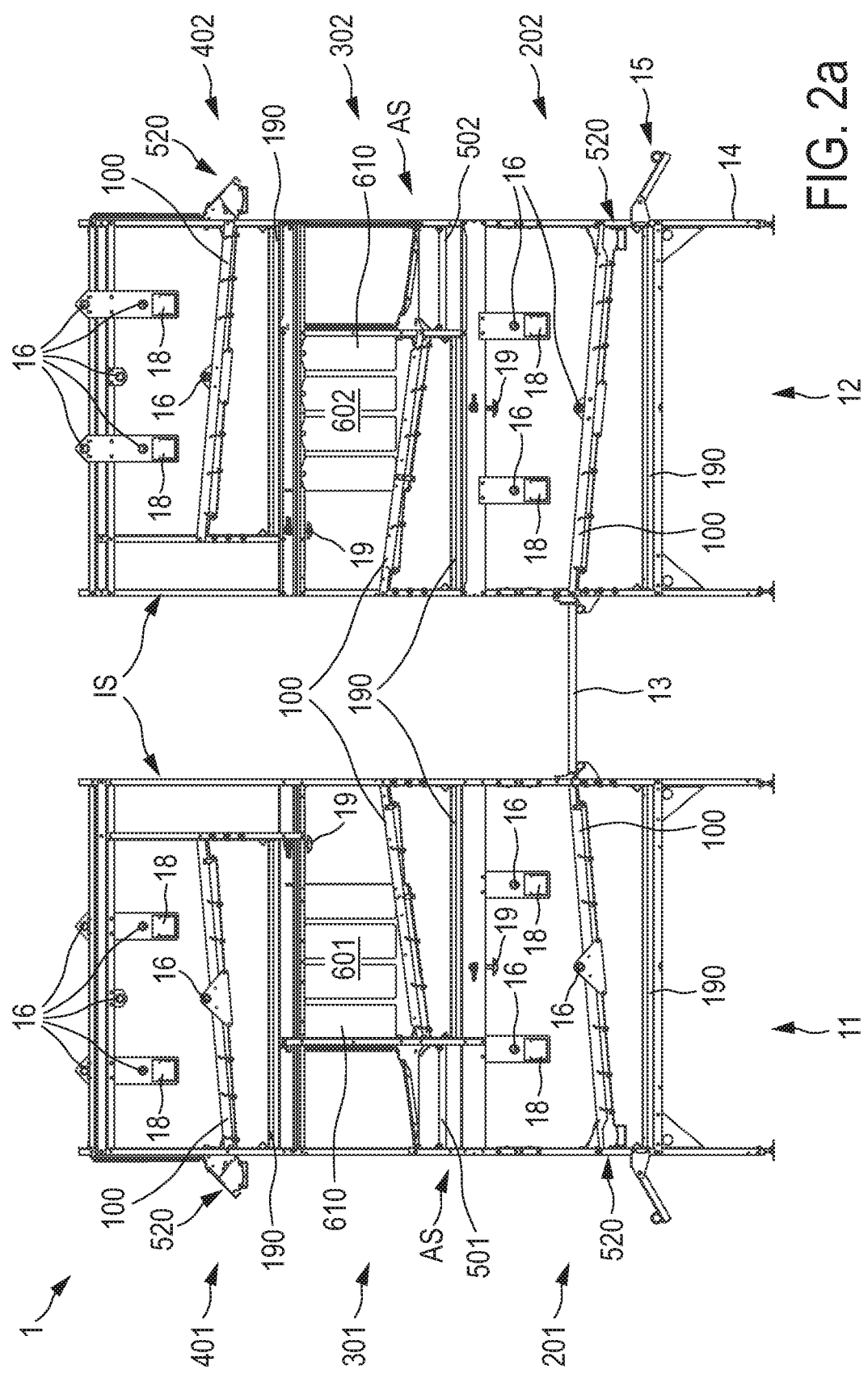
FIG. 2a is a schematic cross-sectional illustration of an example of an aviary arrangement for poultry.
Figure 2C:
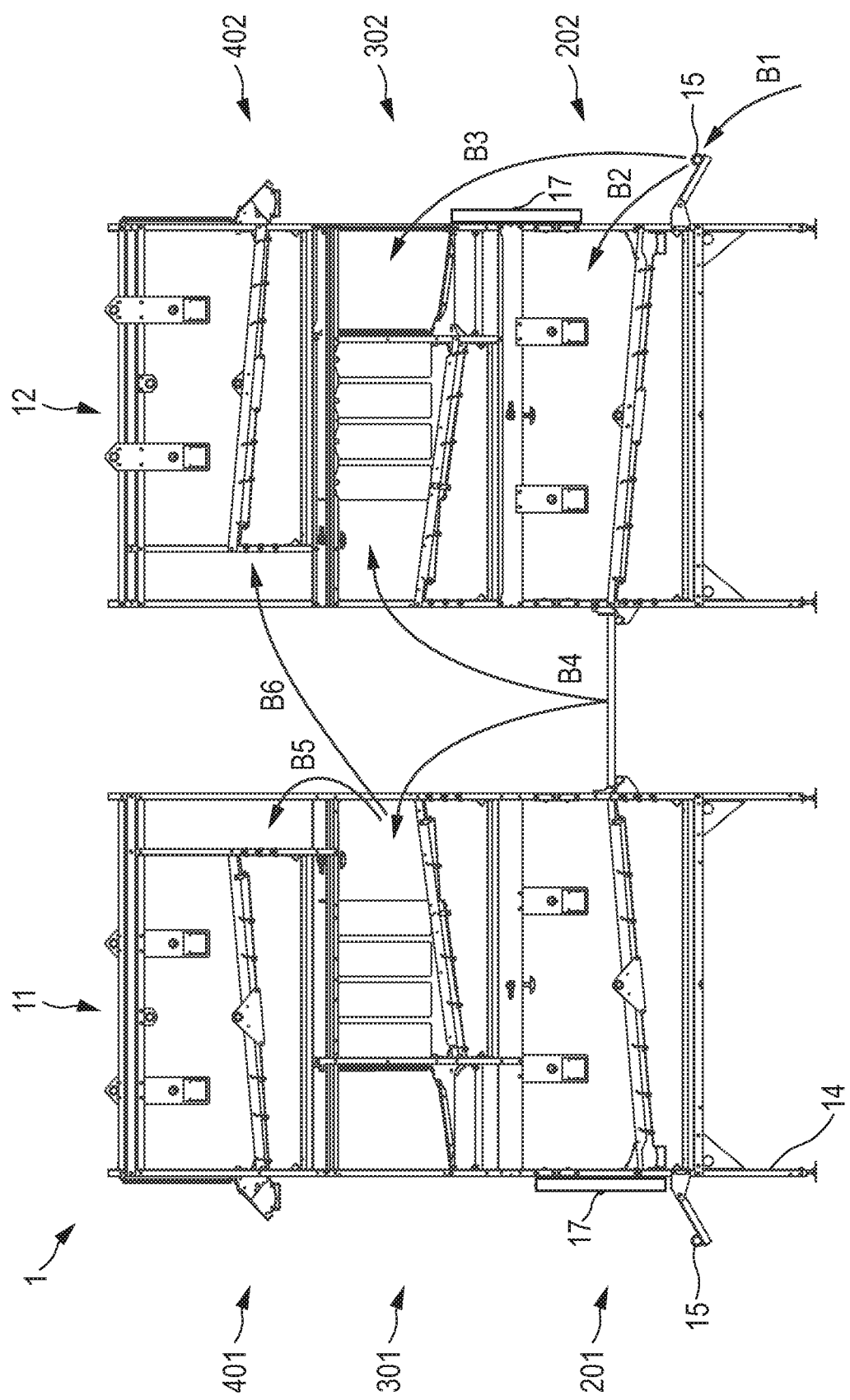
Figure 2D:
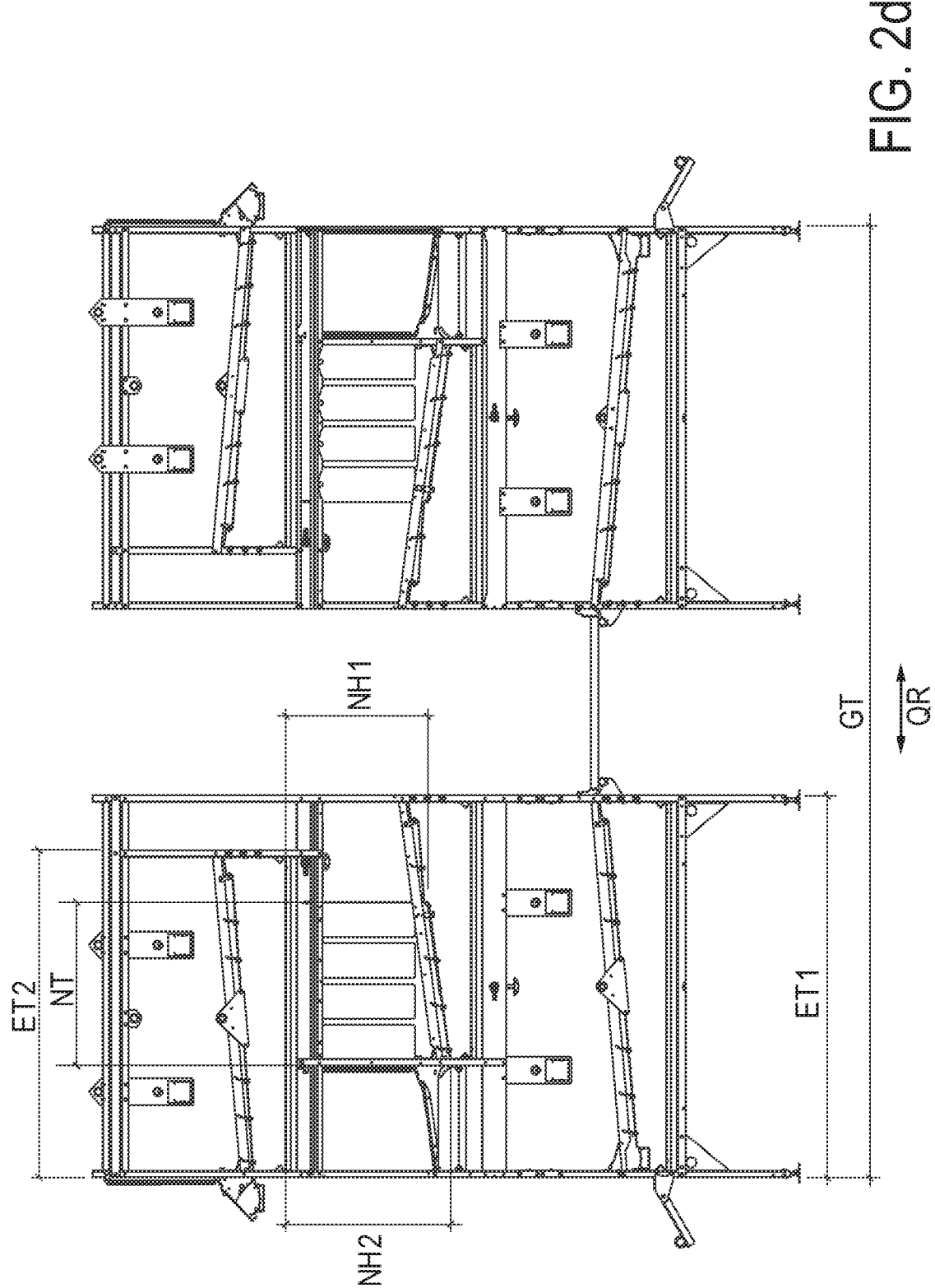
FIG. 2d is the aviary arrangement according to FIG. 2a with selected dimension details.

Possible poultry movements are drawn in by the arrows B1 to B6 in FIGS. 1b and 2c. From the house floor 3, the poultry can first activate, by means of the movement B1, the landing aids 15 still arranged below the service tiers 201, 202 on the outer sides AS. From the landing aid 15, the animals can pass into the service tiers 201, 202 by means of the movement B2. Alternatively, the poultry can pass from the landing aids 15, also by movement B3, onto the useful surface on the coverings 511, 512 above the egg belts of the nest tiers 301, 302.

The poultry can pass through the service tiers 201, 202 to the bridge 13 arranged between the two aviary rows 11, 12. From there, the poultry can pass onto the two nest tiers 301, 302 by means of movement B4. From the nest tiers, the poultry can pass onto the resting tiers 401, 402 by means of the movements B5 and B6.

If the entrance to the service tiers 201, 202 from the house floor 3 via the poultry movements B1 and B2 is blocked, for example, by blocking devices 17 in the form of folding grids, and optionally further entrances to the aviary arrangement 1 are blocked, the poultry can be released inside the aviary arrangement 1. Blocking devices 17 are illustrated by way of example for the service tiers 201, 202 in FIG. 2c. The blocking device 17 in the first aviary row 11 is closed and the blocking device 17 in the second aviary row 12 is open.

The provision of blocking devices 17 is particularly preferred for familiarizing the poultry with the aviary arrangement 1. Owing to the fact that the bridge 13 is designed for receiving litter, a scratching region is also available to the poultry even in the introduced state, in addition to the various functional regions in the form of resting tier 401, 402, nest tier 301, 302, and service tier 201, 202, by means of the bridge 13 covered with litter. The animal movements B4, B5, and B6 are completely accessible even in the introduced state.

For the collection and the transport of eggs arising on the animal roosting floors 100, egg conveying devices 501, 502, namely, a first and a second egg belt, are provided on the outer sides AS of the two nest tiers 301, 302.

Since not all of the eggs are laid in nests, but are also laid outside the nest tier 301, 302, for example, on the service tiers 201, 202 and/or the resting tiers 401, 402, egg collecting devices 520 are also arranged on the outer sides AS of the resting tiers 401, 402 and service tiers 201, 202. Said egg collecting devices 520 are also preferably designed in the form of egg belts, but said egg belts are designed to be narrower than the egg belts 501, 502 of the nest tiers 301, 302 and have a smaller egg collecting and conveying capacity.

As can readily be seen, for example, in FIG. 2a, the egg collecting devices 520 of the resting tiers 401, 402 are arranged on the outer sides AS of the resting tiers 401, 402 while, although the egg collecting devices 520 of the service tiers 201, 202 also face the outer sides AS of the service tiers 201, 202, they are still arranged in the interior of the service tiers 201, 202.

A first covering 511 of the first egg conveying device 501 and a second covering 512 of the second egg conveying device 502 are arranged above the first and second egg belt 501, 502 of the first and second nest tiers 301, 302. Said coverings 511, 512 are accessible to poultry from the outer sides AS of the nest tiers 301, 302. The first and second covering 511, 512 of the first and second egg conveying device 501, 502 each have a closed surface, and, therefore, the eggs collected and transported on the egg belts 501, 502 located therebelow are protected from soiling.

Variable nests 601, 602 are arranged in the nest tiers 301, 302 in a manner directed from the egg belts 501, 502 toward the inner sides IS. A plurality of first nests 601 are located in the first nest tier 301, and a plurality of second nests 602 are located in the second nest tier 302. The nests 601, 602 are formed by displaceable and/or removable nest delimitations 610 and furthermore preferably by nest mats which form the nest floor. The nest mats are preferably also movable and/or removable. The size and/or the number and/or the position of nests 601, 602 within the nest tiers 301, 302 and, in particular, along the row longitudinal direction LR can thereby be varied and adapted to preferences of poultry groups. In particular, a nest depth NT in the transverse direction QR and a nest width in the row longitudinal direction can be varied for this purpose.

The nest depth NT is preferably at least 600 mm, in particular, at least 680 mm. The nest depth NT can preferably also be at least 800 mm, in particular, at least 820 mm. An inner nest height NH1 is preferably at least 400 mm, for example, at least 450 mm or, for example, at least 530 mm, in particular, at least 580 mm. An outer nest height NH2 is preferably 440 mm, for example, at least 500 mm or, for example, at least 600 mm, in particular, at least 650 mm.

Figure 4B:
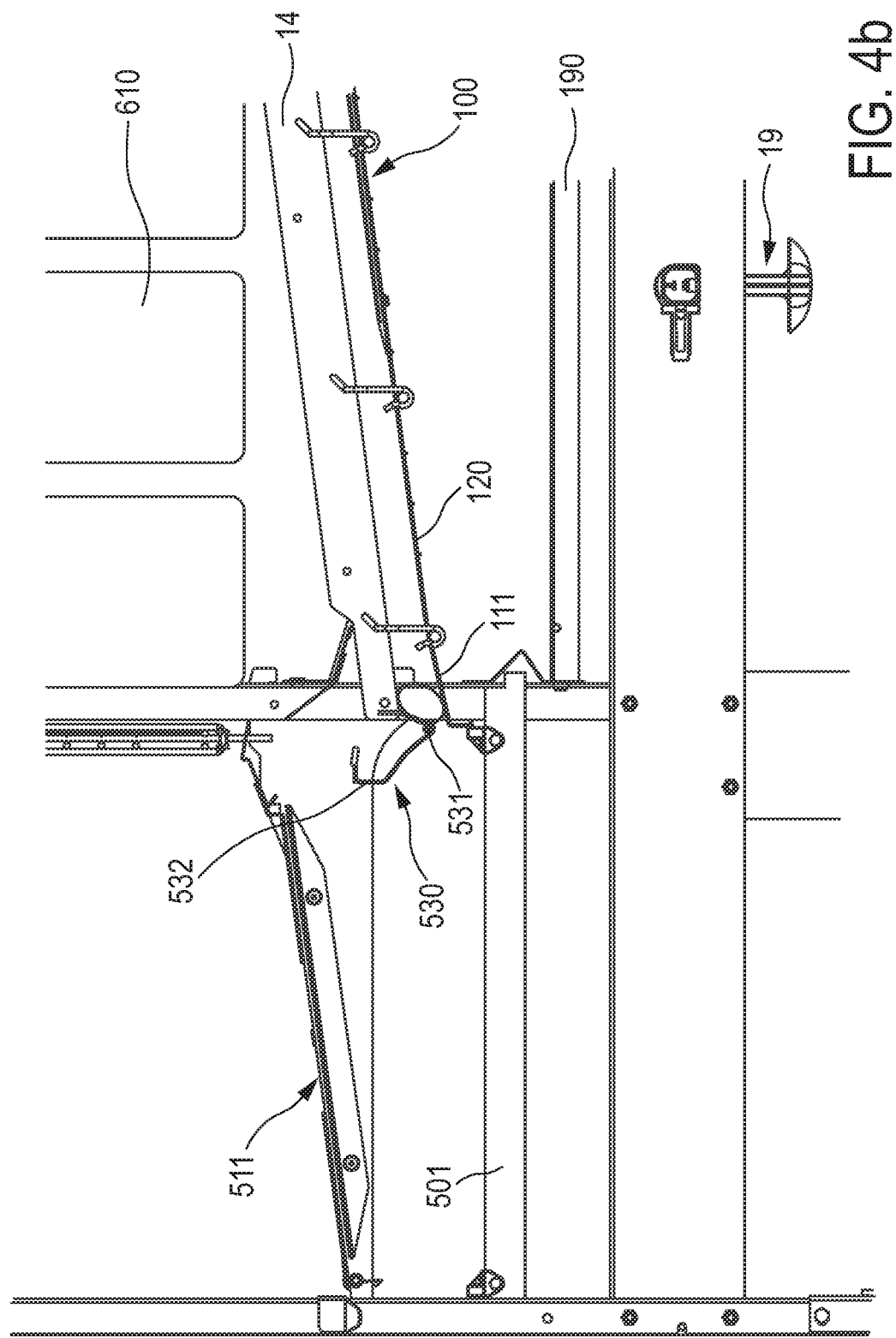
FIG. 4b is a further enlarged schematic cross-sectional illustration of a detail from a nest tier with an egg holding element in the holding position.
Figure 4C:
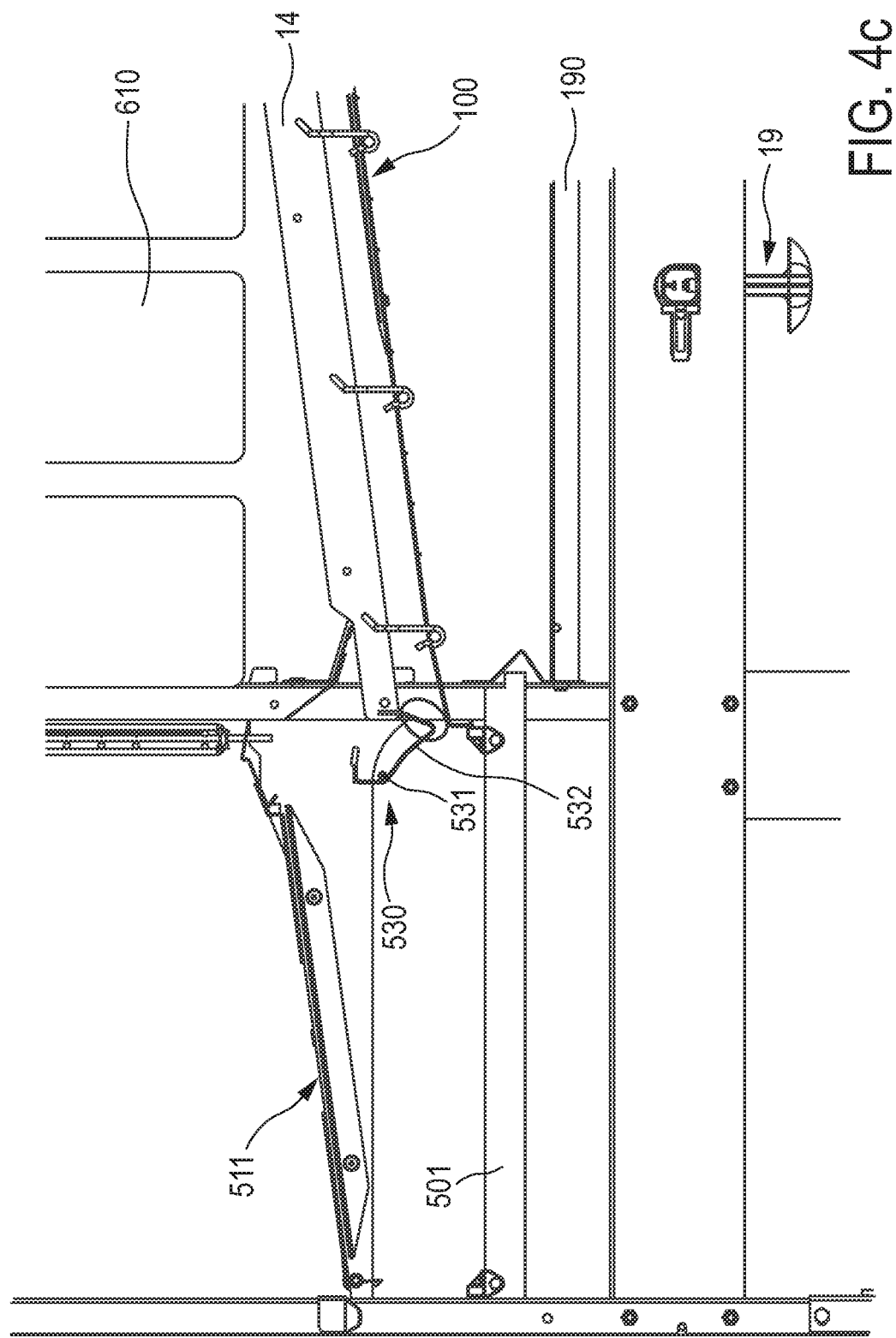
FIG. 4c is the illustration according to FIG. 4b with an egg holding element in the release position.

As illustrated in the enlarged details of FIGS. 4a-c, an egg rollaway region 111 of the animal roosting floor 100 of the first nest tier 301, said egg rollaway region 111 facing the first egg belt 501, has a greater inclination than an adjacent region 120 of the respective animal roosting floor 100. The nest tiers 301, 302 have an egg holding device 530 with an egg holding element 531 in the form of a tensioned wire and with a guide 532. The egg holding element 531 is movable along the guide 532 from the holding position shown in FIG. 4b into the release position shown in FIG. 4c and is movable back. In the holding position, the egg holding element 531 prevents eggs located on the egg rollaway region 111 from rolling away onto the egg belt 501, 502. In the release position, the egg holding element 531 allows eggs located on the egg rollaway region 111 to roll away onto the egg belt 501, 502. The egg holding element 531 is in the holding position shown in FIG. 4b, spaced apart above the egg rollaway region 111 at a height above the egg rollaway region 111 that is smaller than an average height of the eggs, in order to stop the eggs. The egg holding element 531 is brought by raising along the guide 532 into the release position shown in FIG. 4c to a height which is greater than an average height of the eggs. By this means, the eggs can roll away under and through the egg holding element 531.

The method 1000 for poultry management comprises the steps illustrated in FIG. 5, in particular, the arranging 1001 of at least one aviary arrangement 1 for poultry in a poultry house, the providing 1002 of litter on the house floor 3 and/or on the bridge 13 of the aviary arrangement 1, and the putting 1003 of poultry in the poultry house 2.

The invention claimed is:

1. An aviary arrangement for poultry, comprising:
   an inclined animal roosting floor and a manure conveying device arranged below the inclined animal roosting floor, wherein the animal roosting floor comprises an integrated air duct arranged below the animal roosting floor and above the manure conveying device, wherein an upper side of the air duct forms part of the animal roosting floor and the upper side of the air duct is formed in an inclined manner.

2. The aviary arrangement pursuant to claim 1, wherein the upper side of the air duct can be directly entered by a poultry occupying the aviary arrangement.

3. The aviary arrangement pursuant to claim 2, wherein a quantity of soiling and/or excrement located on the upper side of the air duct is carried away by the poultry occupying the aviary arrangement and the quantity of soiling and/or excrement then passes through an adjacent region of the animal roosting floor onto the manure conveying device located there below.

4. The aviary arrangement pursuant to claim 3, wherein the animal roosting floor comprises a grating.

5. The aviary arrangement pursuant to claim 3, wherein accumulations of the quantity of soiling and/or excrement located on the upper side of the air duct, if any at all, are carried away from the upper side of the air duct by movement of the poultry occupying the aviary arrangement.

6. The aviary arrangement pursuant to claim 1, wherein a transition between the upper side of the air duct and an adjacent region of the animal roosting floor is barrier-free for rolling eggs.

7. The aviary arrangement pursuant to claim 1, wherein the air duct directs an air output in the direction of the manure conveying device in order to dry the poultry excrement located thereon.

8. The aviary arrangement pursuant to claim 7, wherein the manure conveying device is disposed at a central longitudinal position below the animal roosting floor.

9. The aviary arrangement pursuant to claim 8, wherein the air duct is disposed at a central longitudinal position below the animal roosting floor such that the air output emerging from the air duct is substantially uniformly distributed on the manure conveying device.

10. The aviary arrangement pursuant to claim 9, wherein the manure conveying device has a first transverse width and the animal roosting floor has a second transverse width substantially the same as the first transverse width.

11. An aviary arrangement for poultry, comprising:
    an aviary row comprising at least one inclined animal roosting floor;
    a manure conveying device arranged below the inclined animal roosting floor; and
    an air duct arranged below the animal roosting floor and above the manure conveying device, wherein an upper side of the air duct forms part of the animal roosting floor and wherein an upper side of the air duct is formed in an inclined manner.

12. The aviary arrangement pursuant to claim 11, wherein a transition between an upper side of the air duct and an adjacent region of the animal roosting floor is barrier free for rolling eggs.

13. The aviary arrangement pursuant to claim 12, wherein an egg collecting device is disposed adjacent the animal roosting floor.

14. The aviary arrangement pursuant to claim 12, wherein the transition between an upper side of the air duct and the adjacent region of the animal roosting floor is formed in a substantially planar manner.

15. The aviary arrangement pursuant to claim 12, wherein the transition between an upper side of the air duct and the adjacent region of the animal roosting floor is substantially the same height as the upper side of the air duct.

16. An aviary arrangement for poultry, comprising:
   an inclined animal roosting floor;
   a manure conveying device arranged below the inclined animal roosting floor; and
   an air duct arranged below the animal roosting floor and above the manure conveying device, wherein an upper side of the air duct forms part of the animal roosting floor, the upper side of the air duct can be directly entered by an poultry occupying the aviary arrangement, and the upper side of the air duct is formed in an inclined manner.

17. The aviary arrangement pursuant to claim 16, wherein a quantity of soiling and/or excrement located on the upper side of the air duct is carried away by the poultry occupying the aviary arrangement and the quantity of soiling and/or excrement then passes through an adjacent region of the animal roosting floor onto the manure conveying device located there below.

\* \* \* \* \*